United States Patent [19]

Morris

[11] Patent Number: 4,887,377
[45] Date of Patent: Dec. 19, 1989

[54] SHAD TYPE FISH BAIT WITH NOSE CAVITY

[75] Inventor: John L. Morris, Springfield, Mo.

[73] Assignee: Bass Pro Shops, Inc., Mo.

[21] Appl. No.: 199,094

[22] Filed: May 26, 1988

[51] Int. Cl.⁴ .............................................. A01K 85/00
[52] U.S. Cl. .................................................. 43/42.24
[58] Field of Search ................. 43/42.21, 42.24, 42.28, 43/42.29, 42.1

[56] References Cited

U.S. PATENT DOCUMENTS

| | | | |
|---|---|---|---|
| 3,068,604 | 12/1962 | Nyberg | 43/42.24 |
| 3,465,466 | 9/1969 | Schowalter | 43/42.24 |
| 3,861,073 | 1/1975 | Thomassin | 43/42.24 |
| 3,879,882 | 4/1975 | Rask | 43/42.28 |
| 3,883,979 | 5/1975 | Williams, Jr. | 43/42.28 |
| 3,959,912 | 6/1976 | Lee | 43/42.28 |
| 4,317,305 | 3/1982 | Firmin | 43/42.24 |

OTHER PUBLICATIONS

Bass Pro Shops, Christmas 1987 Catalog, p. 54, "Tenderhead TM Action Shad", published 9/26/87.

Primary Examiner—Nicholas P. Godici
Assistant Examiner—Michael Willia Starkweather

[57] ABSTRACT

A soft plastic shad type fishing lure having a nose cavity in its leading end for receiving a lead jig head in order to enhance the natural appearance and motion of the bait for greater appeal to fish.

4 Claims, 1 Drawing Sheet

SHAD TYPE FISH BAIT WITH NOSE CAVITY

BACKGROUND AND SUMMARY OF THE INVENTION

This invention relates generally to artificial fish bait and more particularly to a shad type bait having a nose cavity for receiving a lead jig head.

Soft plastic fishing baits have been available in a variety of styles which are usually made to simulate the appearance of live baits. For example, it has been found that soft plastic lure bodies hooked on lead jig heads provide bait that is highly attractive to many fishes. The fish hook which projects from the jig head is normally hooked through the head portion of the plastic bait with the jig head located adjacent to the face area of the plastic body. The presence of the lead jig head adjacent to the plastic bait detracts from the natural appearance of the bait and can reduce its effectiveness for this reason. In addition, the movement of the plastic bait in the water is affected by the presence of the jig head, and this can also decrease its appeal to fish.

The present invention is directed to a soft plastic shad type bait having a nose cavity in the leading end of the plastic lure for receiving a weighted jig head such as a lead head. The placement of the jig head in the cavity locates it internally in the bait where it is not noticeable to fish and does not adversely affect the natural movement of the bait. At the same time, the jig can be tied on a fishing line so that the bait can be fished in the normal way.

DETAILED DESCRIPTION OF THE INVENTION

Figure 1:
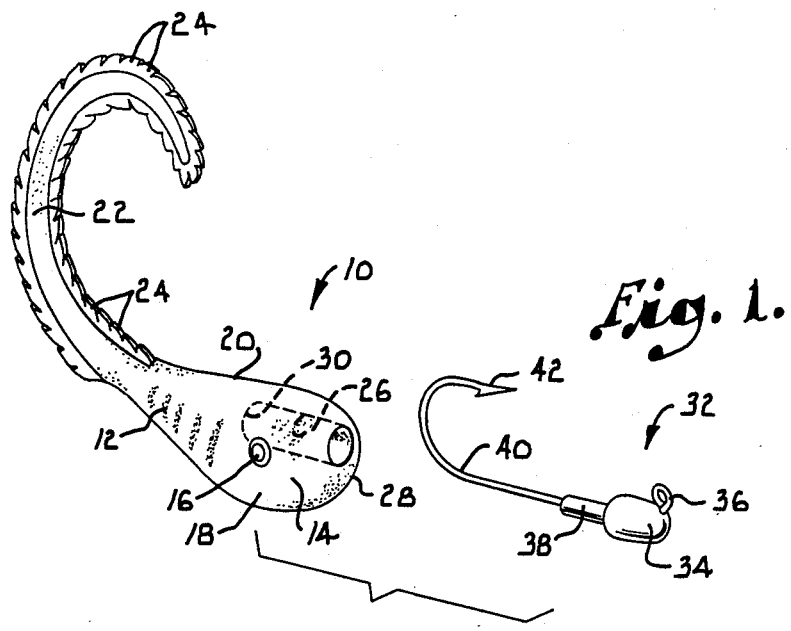
Figure 2:
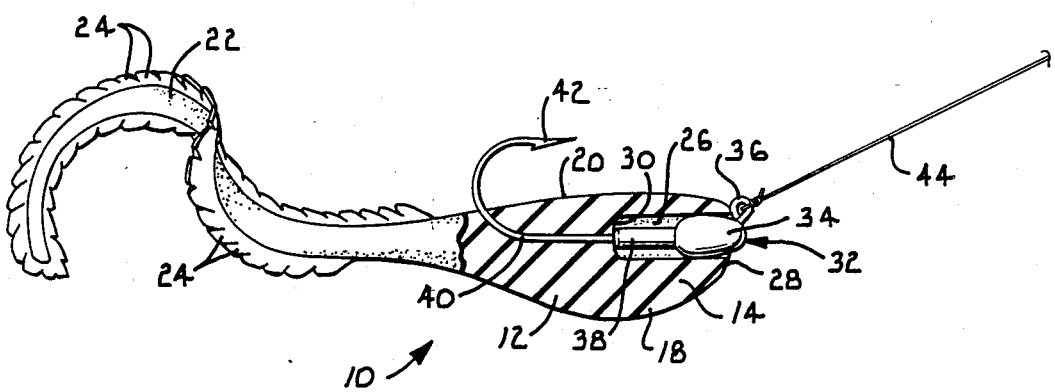

In the accompanying drawing which forms a part of the specification and is to be read in conjunction therewith and in which like reference numerals are used to indicate like parts in the various views:

FIG. 1 is an exploded perspective view showing a lead jig head and a soft plastic lure body constructed according to a preferred embodiment of the invention; and FIG. 2 is a side elevational view showing the lure body with the jig head applied thereto and the hook extended through the body, with a portion shown in section for purposes of illustration.

Referring now to the drawing in more detail, numeral 10 generally designates an artificial fishing lure constructed in accordance with a preferred embodiment of the present invention. The lure 10 has a soft plastic body 12 which is formed to simulate the shape and appearance of a shad. The leading or nose end of the shad body 12 has a facial area 14 on which a pair of eyes 16 are painted or otherwise applied. Beneath and behind the facial area 14, the bottom of the lure body bulges downwardly at 18. The lure body has a back 20 which faces upwardly in normal use of the lure. Extending from the trailing end of the lure body 12 is an elongate tail 22 which is preferably twisted and constructed in a thin fashion so that it flutters as the lure moves through the water. Scales 24 probably extend from the edges of the tail 22.

As previously indicated, the lure body 12 is preferably constructed of a soft plastic material of the type commonly used in the construction of artificial baits. The lure body 12 is also preferably colored to simulate the coloring of shad. For example, the lure body may be a light silvery color for the most part with black or other dark coloring applied to the back 20 and the forward end portion of the tail 22. Other coloring patterns are possible as well.

In accordance with the present invention, a cylindrical nose cavity 26 extends into the lure body 12 from a rounded nose area 28 on the leading end of the lure. Cavity 26 is open on its forward end at the nose 28 and is closed at its inner end 30 at a location above the bulge 18 and below the back 20. The axis of the cavity 26 is preferably generally horizontal or parallel to the back 20.

The lure body 12 is used with a jig head such as that generally identified by numeral 32. The jig head 32 has on its leading end a weighted head 34 which is generally oval and constructed of lead or some other relatively heavy material. The head 34 has an eyelet 36 projecting upwardly from its forward end. A fish hook 40 extends from the head 34 and terminates in the usual barbed tip 42.

In use, the lead jig head 32 is applied to the lure 10 in the manner shown in FIG. 2. The barbed tip 42 of the fish hook is extended into the cavity 26 to its inner end 30 and is pierced through the lure body 12, emerging through the back 20 near the tail 22. The head 34 is extended into and fits closely in the cavity 26 with the end of the collar 38 butted against the closed end 30 of the cavity. This places all of the jig head 32 within the cavity 26 and allows the eyelet 36 to pierce out of the cavity where it can be easily tied to a fishing line 44.

The lure 10 can then be fished in the usual manner, and any fish that strike on it are hooked on the fish hook 40. By virtue of the presence of the cavity 26 and the close fit of the jig head 34 in it, the jig head can be located for the most part internally of the lure body so that it does not detract from the natural appearance of the bait. The overall result is that the lure 10 has a natural appearance and movement which make it highly attractive to fish. At the same time, the fish hook 40 is properly positioned for hooking any fish that strike on the bait.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. An artificial fish bait comprising:
    a soft plastic lure body having a nose on one end and a tail on the other end, said nose having a substantially cylindrical cavity extending therein with said cavity being open at the nose; and
    a weighted jig head formed separately from the lure body and having an eye and a hook projecting therefrom, said jig head having a curved outer surface and fitting closely in said cavity with the hook extending through the lure body and the eye projecting out of the cavity to receive a fishing line on which the bait is tied.

2. The bait of claim 1, wherein said lure body has a shape and appearance simulating a shad.

3. The bait of claim 2, wherein said tail is twisted.

4. An artificial fish bait comprising:
- a soft plastic lure body having a shape and appearance simulating a shad and having a nose on one end and a twisted tail on the other end;
- a pre-formed cavity extending into the lure body from the nose thereof and having an open end at the nose, said cavity having a substantially cylindrical shape; and
- a weighted jig head formed separately from the lure body and having an eye and hook projecting therefrom, said jig head having a curved outer surface and fitting closely in said cavity with the hook extending through the lure body and the eye projecting out of the cavity to receive a fishing line on which the bait is tied.

* * * * *